United States Patent [19]

Obara et al.

[11] Patent Number: 5,630,592

[45] Date of Patent: May 20, 1997

[54] METAL GASKET, VACUUM FLANGE FOR THE METAL GASKET, AND VACUUM SEAL STRUCTURE USING THE METAL GASKET

[75] Inventors: Kenjiro Obara; Yoshio Murakami, both of Ibaraki-ken; Mitsuyosi Saito, Tokyo, all of Japan

[73] Assignees: Japan Atomic Energy Research Institute; Japan Vac's Metal Co., Ltd., both of Tokyo, Japan

[21] Appl. No.: 658,307

[22] Filed: Jun. 5, 1996

Related U.S. Application Data

[63] Continuation of Ser. No. 319,093, Oct. 6, 1994, abandoned, which is a continuation of Ser. No. 998,684, Dec. 30, 1992, abandoned.

[30] Foreign Application Priority Data

Dec. 30, 1991 [JP] Japan ................... 3-360188

[51] Int. Cl.⁶ ............................................. F16J 15/08
[52] U.S. Cl. ..................... 277/167.5; 277/171; 277/236; 285/336
[58] Field of Search ........................ 277/105, 167.5, 277/168, 171, 184, 207 A, 210, 236; 285/336, 339, 349, 363, 917, 918

[56] References Cited

U.S. PATENT DOCUMENTS

| | | | |
|---|---|---|---|
| 3,078,110 | 2/1963 | Starr | 285/917 X |
| 3,208,758 | 9/1965 | Carlson et al. | 277/236 |
| 3,618,989 | 11/1971 | Ito | 285/917 X |
| 3,794,361 | 2/1974 | Westberg | 285/336 |
| 4,303,251 | 12/1981 | Harra et al. | 277/236 |
| 4,406,467 | 9/1983 | Burger et al. | 277/105 |

FOREIGN PATENT DOCUMENTS

| | | | |
|---|---|---|---|
| 0459510 | 12/1991 | European Pat. Off. | |
| 0609012 | 5/1978 | U.S.S.R. | |
| 8903495 | 4/1989 | WIPO | 277/236 |

*Primary Examiner*—Scott Cummings
*Assistant Examiner*—John L. Beres
*Attorney, Agent, or Firm*—Oblon, Spivak, McClelland, Maier & Neustadt, P.C.

[57] ABSTRACT

A ring-shaped metal gasket with the cross-section thereof being substantially rectangular shaped, with the ratio (t/w) of the thickness t of the ring portion to the width w thereof being in the range of 0.5 to 4, having a Vickers hardness in the range of 50 to 120; a vacuum flange for a metal gasket, including a sealing groove for receiving a metal gasket at the surface of the flange, the width of a cross section of the groove gradually decreasing in the direction of the depth thereof, an outer side wall section of the sealing groove being substantially perpendicular to the flange surface, and an inner side wall section of the sealing groove being inclined with respect to the flange surface, with a difference in level being provided so that the flange surface positioned to the inside of the sealing groove is lower than the flange surface positioned to the outside of the sealing groove, and a vacuum seal structure including the above gasket and flange are disclosed.

9 Claims, 7 Drawing Sheets

METAL GASKET, VACUUM FLANGE FOR THE METAL GASKET, AND VACUUM SEAL STRUCTURE USING THE METAL GASKET

This application is a continuation of application Ser. No. 08/319,093, filed on Oct. 6, 1994, now abandoned, which is a continuation of application Ser. No. 07/998,684, filed on Dec. 30, 1992, now abandoned.

BACKGROUND OF THE INVENTION

1. Field of the Invention

The present invention relates to a metal gasket, a vacuum flange for the metal gasket, and a vacuum seal structure using the metal gasket utilized in a vacuum seal at connections for piping and the like in a vacuum device.

2. Description of the Prior Art

Conventionally, a vacuum seal structure using a flange and a metal gasket is utilized with the object of removably connecting vacuum piping and the like used in various types of devices which operate under a vacuum.

The reason for using a metal gasket is that it is necessary to bake the piping and the like at a high temperature in order to quickly remove the gas which adheres to the inner walls of the vacuum vessels, vacuum piping, and the like, and to establish the processing conditions in the vacuum device.

Conventionally, a combination of a knife-edge-type metal-seal flange and a metal gasket made from oxygen-free copper is commonly known as a vacuum seal structure used with this objective. This seal structure is illustrated in FIG. 8A and in FIG. 8B, and a perspective view of a metal gasket is illustrated in FIG. 9.

A conventional metal gasket 15 is shaped as a ring with a width w and a thickness t. From the requirements for using such a gasket, which will be later explained, the width w is normally formed quite large in relation to the thickness t. Specifically, as shown below in Table 1, a metal gasket with a width w of about 6 mm and a thickness t of about 2 mm, giving a t/w ratio of about 0.33, is used with a knife-edge-type metal-seal flange of an outer diameter of 70 mm. Also, a metal gasket with a width w of about 9 mm and a thickness t of about 2 mm, giving a t/w ratio of about 0.22, is used with a knife-edge-type metal-seal flange for which the outer diameter exceeds 70 mm.

TABLE 1

Dimensions of gaskets used with conventional knife-edge-type metal-seal flanges

| Knife-edge-type metal-seal flange outer diameter | Gasket dimensions (mm) | | |
|---|---|---|---|
| | Width (w) | Thickness (t) | t/w |
| 70 | 6 | 2 | 0.33 |
| 114, 152, 203, 253 | 9 | 2 | 0.22 |

Two projecting sections 23a, 23a are formed on the respective inner peripheral sides of a pair of flange members 23, 23. Two pipes 21, 21 are welded in an airtight manner to the respective projecting sections 23a, 23a. Inner walls 29, 29 are formed on the opposing surfaces of the flange members 23, 23, provided with a difference in level so that the side on the inner periphery is lower. Two knife edges 25, 25 project into the inner walls 29, 29 toward the inner peripheral side.

When providing a seal between the two flange members 23, 23, the metal gasket 15 is accepted into the inner wall 29 of one of the flange member 23, the other flange member 23 is laid on top, and the two flange members 23, 23 are pressed together by means of a compression bolt 35 and a nut 37. The flange members 23, 23 which are compressed by the bolt 35 and the nut 37 transmits the compression force to the knife edges 25, 25 of the sealing section of the flange members 23, 23. Tip sections 25a, 25a of the knife edges 25, 25 bite into the metal gasket 15 so that the metal gasket 15 is subjected to plastic deformation. The outer surface of the metal gasket 15 is therefore pressed against the inner walls 29, 29 of the flange member 23, 23. As a result, an opposing force produced on the inside of the metal gasket 15 acts against the contact surfaces of the metal gasket 15 and the knife edge 25 and maintains the sealing performance.

Therefore, in this mechanism, for the seal performance to be reliable, the outer surface of the metal gasket 15 which has undergone plastic deformation must extend over the entire periphery of the metal gasket 15 and the contact with the inner wall 29 of the flange member 23 becomes, of necessity, an indispensable element. However, the movement of the metal gasket 15 in the radial direction is restricted because the knife edge 25 cuts into the gasket 15, and in order to make it possible to bring the entire periphery of the outer surface of the metal gasket 15 into contact the inner wall of the flange member 23, it is necessary that the outer surface of the metal gasket 15 and the inner wall 29 of the flange member 23 be already close together when the metal gasket 15 is being mounted on the flange member 23. For this reason the metal gasket 15 must be manufactured with a high degree of precision, but there are inherent limits to present fabricating methods using a pressing process. In addition, even if the outer surface of the metal gasket 15 and the inner wall 29 of the flange member 23 are almost touching over the entire periphery during temporary installation, in such a case the removal of the metal gasket after use is extremely difficult.

In such a case, as the result of the restriction of the movement of the metal gasket 15 in the radial direction because of being bit into by the knife edge 25 and various fabrication errors in the flange member 23 and the metal gasket 15, it is rare to have the outer surface of the plastically deformed metal gasket 15 contact the entire periphery of the inner wall 29 of the flange member 23. As a result, the implementation of a high temperature heating process (baking) of 100° C. or greater for the vacuum device causes leaks to develop in the flange clamping section.

In addition, there is a strong possibility of producing a leak in a conventional knife-edge-type metal-seal flange, if the head of the knife edge is damaged. Therefore, the handling and the control of the flange is bothersome. Also, when the damage is extensive, reclamation is difficult.

Japanese laid-Open Patent Application 59-54857 discloses the provision of a notched section in the flange or a notched groove in the gasket itself for the relief of a deformed, swollen portion of the metal gasket when sealing is conducted by subjecting a metal gasket with a rectangular cross-section to compression deformation. However, this metal gasket is made from a soft material with the prerequisite that a large amount of swelling is produced from the deformation. The sealing principle is completely different from that of the present invention. Also, the metal gasket is deformed so that it adheres closely and completely covers over the sealing groove in the flange.

SUMMARY OF THE INVENTION

A first object of the present invention is to provide, with due consideration to the drawbacks of such conventional metal gaskets, a metal gasket, a flange, and a seal structure by which it is possible to reliably seal a flange fastener section for which high vacuum seal characteristics are required, as on a vacuum device.

A second object of the present invention is to provide a metal gasket which can be used repeatedly, and a vacuum seal structure for use with the metal gasket.

A third object of the present invention is to provide a flange which is difficult to be damaged during maintenance and handling to the point where the sealing performance is adversely affected, and to provide a flange for which parts positioned at the inner section of a vacuum device are not easily soiled during maintenance and handling when installed in the vacuum device, as well as a vacuum seal structure used with the flange.

The inventors of the present invention have discovered that it is possible to repeatedly use a metal gasket provided with a cross-section shaped almost as a rectangular ring, wherein, when the width of the wall of the ring is w and the thickness of the gasket is t, the ratio t/w is in the range of 0.5 to 4, and provided with a Vickers' hardness in the range of 50 to 120.

In addition, it has been discovered that the flange fastener section can be reliably vacuum-sealed by providing a flange, used in combination with the metal gasket, which has a cut sealing groove at the flange surface thereof, with the inner side wall section thereof being inclined with respect to the flange surface in such a fashion that the width of the sealing groove cross-section gradually narrows in the direction of the depth of the sealing groove, and with the outer side wall section thereof being substantially at a right angle to the flange surface.

A conventionally-known knife-edge-type metal-seal flange can be used as such a flange. However, in this case also, the knife edge and the metal gasket do not come into contact, and the metal gasket is accepted into a groove section provided in the outer peripheral side of the knife edge.

A flange, in combination with the metal gasket, can also be used, which flange has (1) a cut sealing groove at the flange surface thereof, with the inner side wall section thereof being inclined with respect to the flange surface in such a fashion that the width of the sealing groove cross-section gradually narrows in the direction of the depth of the sealing groove, and with the outer side wall section thereof being substantially at a right right angle to the flange surface; (2) no protruding section on the flange surface on the inside of the sealing groove; and (3) a difference in level provided so that the flange surface positioned to the inside of the sealing groove is lower than the flange surface positioned to the outside of the sealing groove. With this flange, adverse effects to the sealing performance and vacuum characteristics caused by damage and soiling of the flange during maintenance and handling can be prevented. The flange itself is novel and useful.

BRIEF DESCRIPTION OF THE DRAWINGS

These and other objects, feature, and advantages of the present invention will become more apparent from the following description of the preferred embodiments taken in conjunction with the accompanying drawings, in which.

DETAILED DESCRIPTION OF THE INVENTION

Figure 1:
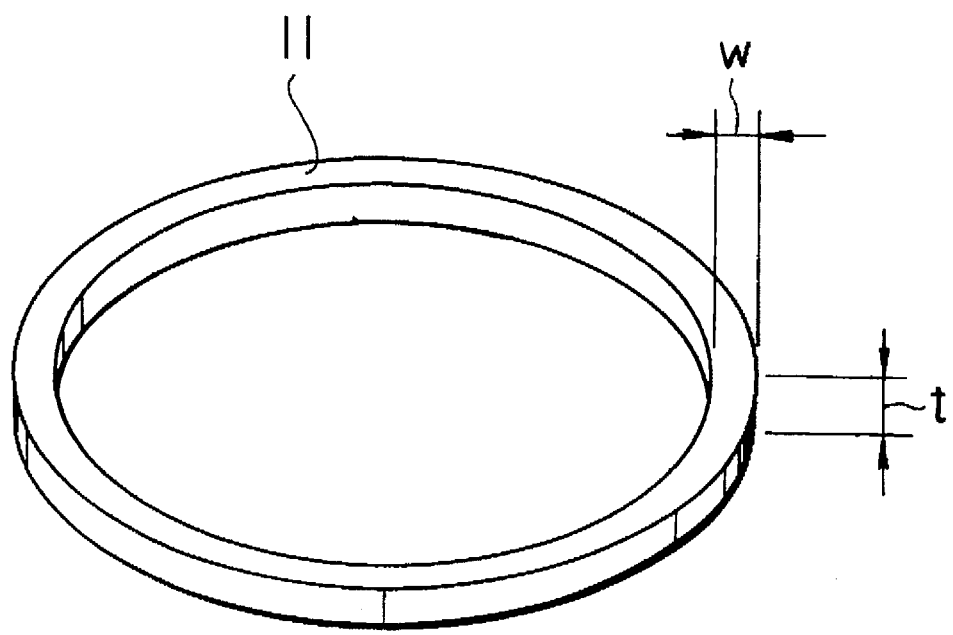
FIG. 1 is a perspective view of an embodiment of a metal gasket of the present invention.

FIG. 1 is a perspective view of an embodiment of a metal gasket 11 of the present invention. The metal gasket 11 is ring-shaped with an almost rectangular cross section. When the width of the ring section is w and the thickness is t, the ratio t/w is in the range of 0.5 to 4. If the ratio t/w is 0.5 or greater, the strength of the fastening is sufficient. Also, after the device has been dismantled, it can be reused, or the number of times of reuse is increased. If the ratio t/w is 4 or less, a stable clamping and sealing is possible. If the ratio t/w is too large, there are cases where the sealing performance is lowered because of the fastening balance when clamping, therefore it is preferable that the ratio t/w of the metal gasket 11 be in the range of 0.8 to 2.

The material from which the metal gasket 11 is fabricated is a metal material with a Vickers' hardness in the range of 50 to 120, and preferably in the range of 80 to 110. Examples of suitable materials include oxygen-free copper, Cu—Zr alloys (where the Zr content is 0.01 to 0.2 wt. %), and the like.

Figure 2A:
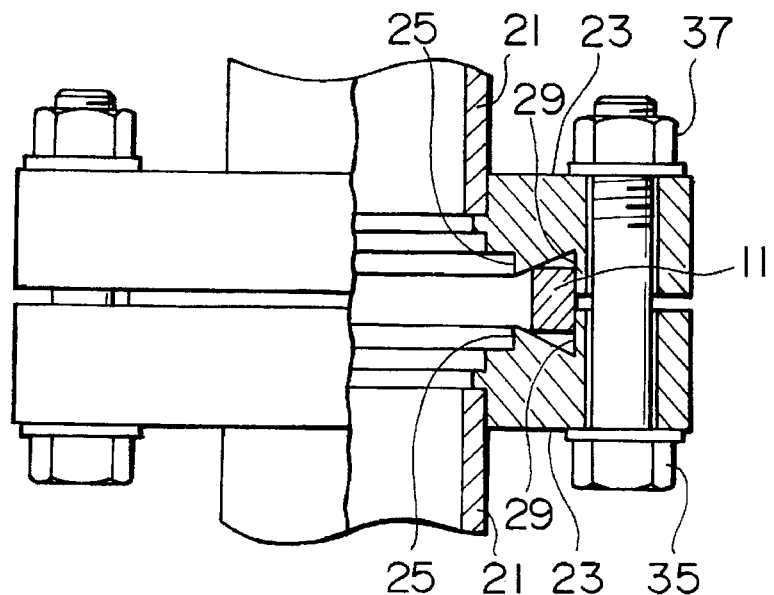
FIG. 2A is a half cross-sectional view of an embodiment of a seal structure of the present invention.
Figure 2B:
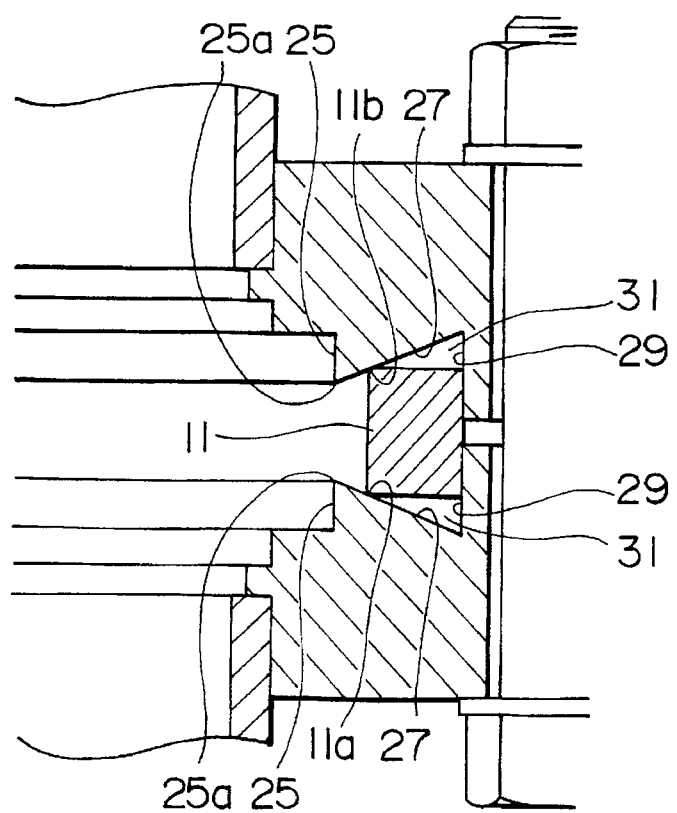
FIG. 2B is a partially enlarged view of FIG. 2A.

By adjusting the width w of the metal gasket 11, usually, by making it 2.5 mm or less, a conventional knife-edge-type metal-seal flange can be used without modification so that the seal structure of the present invention can be provided. FIG. 2A is a half cross-sectional view showing an embodiment of a seal structure of the present invention. FIG. 2B is a partially enlarged view of the sealing portion shown in FIG. 2A.

The flange members 23, 23, which are welded in an airtight manner to pipes 21, 21 are in mutual opposition through the metal gasket 11 and are compressed by the compression bolt 35 and the nut 37. A concave section formed by the inner wall 29 and a knife edge tapered section 27 (inclined section) are used as a sealing groove. The metal gasket 11 is accepted into this concave section. The knife edge tapered section 27 is in contact with the inner wall of the gasket 11 at two locations, gasket corners 11a and 11b. The outer surface of the gasket 11 contacts the inner wall 29 under compression.

With the metal gasket and the vacuum seal structure shown in FIG. 2, the metal gasket 11 does not undergo plastic deformation from the tip section 25a of the knife edge 25. The two gasket corners 11a, 11b and the entire peripheral outer surface of the metal gasket 11 can receive the compressive force from the flange members 23, 23 so that a reliable sealing performance is obtained.

Plastic deformation is not produced at the metal gasket 11 from the knife edge 25, therefore the structure is easily removed when the device is dismantled, and can be reused repeatedly.

Figure 3A:
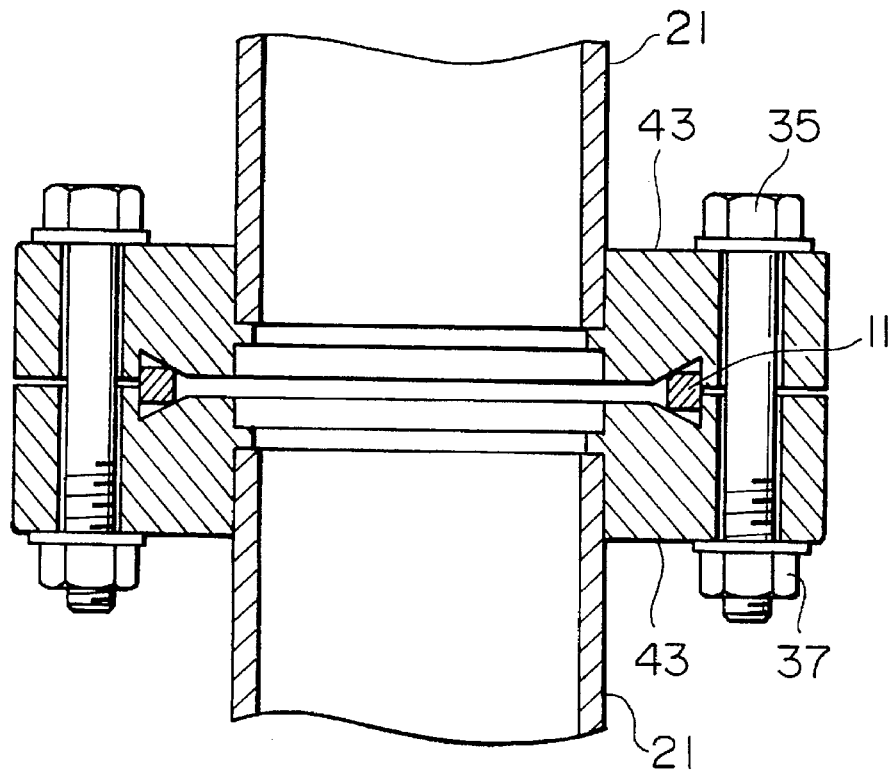
FIG. 3A is a cross-sectional view of an embodiment of a flange and a seal structure of the present invention.
Figure 3B:
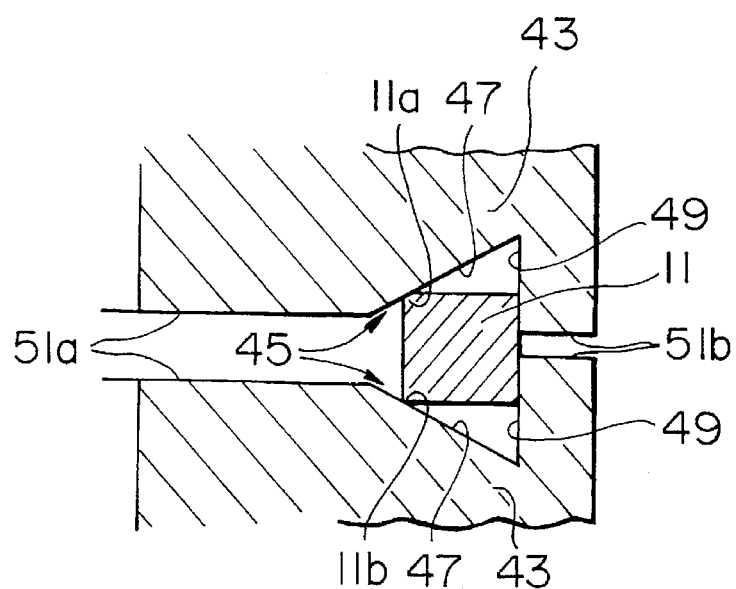
FIG. 3B is a partially enlarged view of the flange shown in FIG. 3A.

FIG. 3 illustrates another embodiment of the flange and seal structure of the present invention, and shows a suitable flange of the present invention and a seal structure combined with that flange in a metal gasket with a rectangular cross section. In addition, FIG. 5 shows that there is no projecting section, such as the knife edge 25 shown in FIG. 2, on the inner side of a sealing groove 45 of a flange member 43 in this flange. This type of projecting section is essentially unnecessary with the sealing structure of the present invention.

The flange members 43, 43 are welded in an airtight manner to the ends of the pipes 21, 21. An inclined inner wall section 47 is provided on flange surfaces 51 (opposing surfaces) of the flange members 43, 43, and an outer wall section 49 is cut almost perpendicularly to form the sealing grooves 45, 45. Then, the metal gasket 11 with an almost rectangular cross-section is accepted between the two sealing grooves 45, 45, and is compressed by the compression bolt and nut 35, 37 so that a sealing structure is formed. In this sealing structure, the same operating effect is obtained as shown in FIG. 2. Specifically, the metal gasket 11 receives the compression force from the flange members 43, 43 through the inclined inner wall sections 47, 47 and the perpendicular outer wall sections 49, 49 on the outer peripheral surface of the metal gasket 11 and the two gasket corners 11a, 11b.

Further, because the dimensions of the sealing grooves 45, 45 and the metal gasket 11 can be arbitrarily adjusted in a mutually compatible manner, it is possible to arbitrarily set the width w and the thickness t of the ring section of the metal gasket 11. As previously outlined, the ratio t/w of the metal gasket 11 is preferably in the range of 0.5 to 4, and more preferably in the range of 0.8 to 2.

Figure 4:
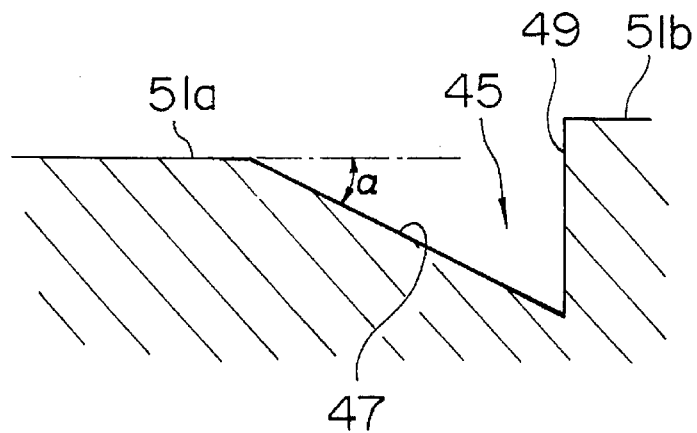
FIG. 4 is a partial cross-sectional view of a sealing groove.

As shown in FIG. 4, the angle α (angle of inclination) between the inclined inner wall sections 47 and the flange surface 51 (51a) of the sealing groove 45 is 15° to 45°, and more preferably 15° to 30°. In such a case, a highly reliable sealing effect is obtained.

Figure 5A:
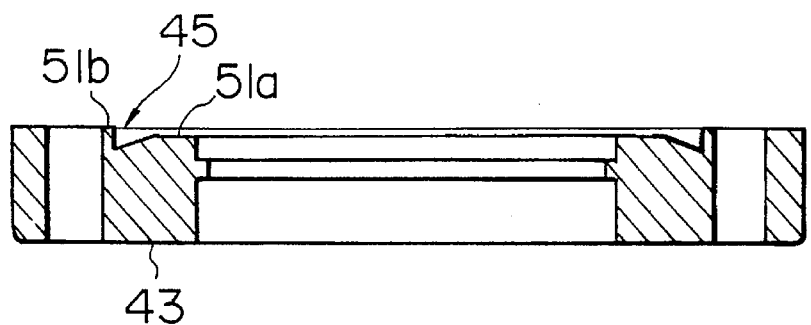
FIG. 5A is a cross-sectional view of an embodiment of a flange of the present invention.
Figure 5B:
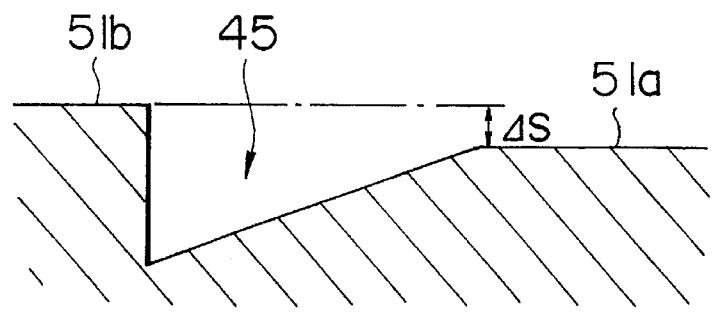
FIG. 5B is a partially enlarged view of the flange shown in FIG. 5A.

FIG. 5A is a cross-sectional view of the flange member 43 of the present invention. FIG. 5B is a partially enlarged view of the flange member 43 shown in FIG. 5A. The flange surface 51a located to the inside of the sealing groove 45 of the flange member 43 is provided at a level which is Δs lower than the flange surface 51b located to the outside. Accordingly, prior to using the sealing structure, the inner flange surface 51a is not soiled by contact with any object such as a table or floor surface, even when the flange member 43 is placed with the flange surface 51 side down, or when something is set on the flange surface 51. The inside of the flange surface 51a is a part which is positioned in the vacuum system after the formation of the sealing mechanism. If this part is soiled, gas escapes from inside the vacuum atmosphere, and the like, which has an adverse effect on the vacuum system. Also, in the case where the inner flange surface 51a and the outer flange surface 51b are at the same level (when Δs=0), the metal gasket 11 becomes crushed when reused repeatedly so that the opposing surfaces of the two flanges approach a tightly adhering state. Gas therefore tends to accumulate in the part enclosed by the inner surface of the metal gasket 11 and the inner side wall section of the flange. When this occurs, the accumulated gas is gradually released when the vacuum is drawn, making it difficult to achieve a high degree of vacuum. The time required to draw the vacuum is also extended. When the difference in level Δs is provided, the inner flange surfaces 51a do not adhere closely to one other, therefore the above-mentioned plastic deformation is prevented.

Further, the metal gasket and the sealing groove necessary for forming the seal structure provide an indented section which differs from a knife edge. Therefore the part in contact with the metal gasket 11 is not readily damaged so that there is no concern with respect to leaks caused by damage.

The difference in level Δs is preferably in the 0.3 to 1.0 mm range, and more preferably in the 0.3 to 0.7 mm range. With the flange member 43 illustrated in FIG. 3 to FIG. 5, the sealing surface 51a located to the inside of the sealing groove 45 is flat, so there is no projecting section such as the knife edge 25 shown in FIG. 2, providing a simple structure for which fabrication and handling is easy. Further, in the foregoing description the sealing groove is shown angled in a straight line, but a sealing groove with an inner side wall section which is inclined in a curved line is also acceptable.

Figure 6:
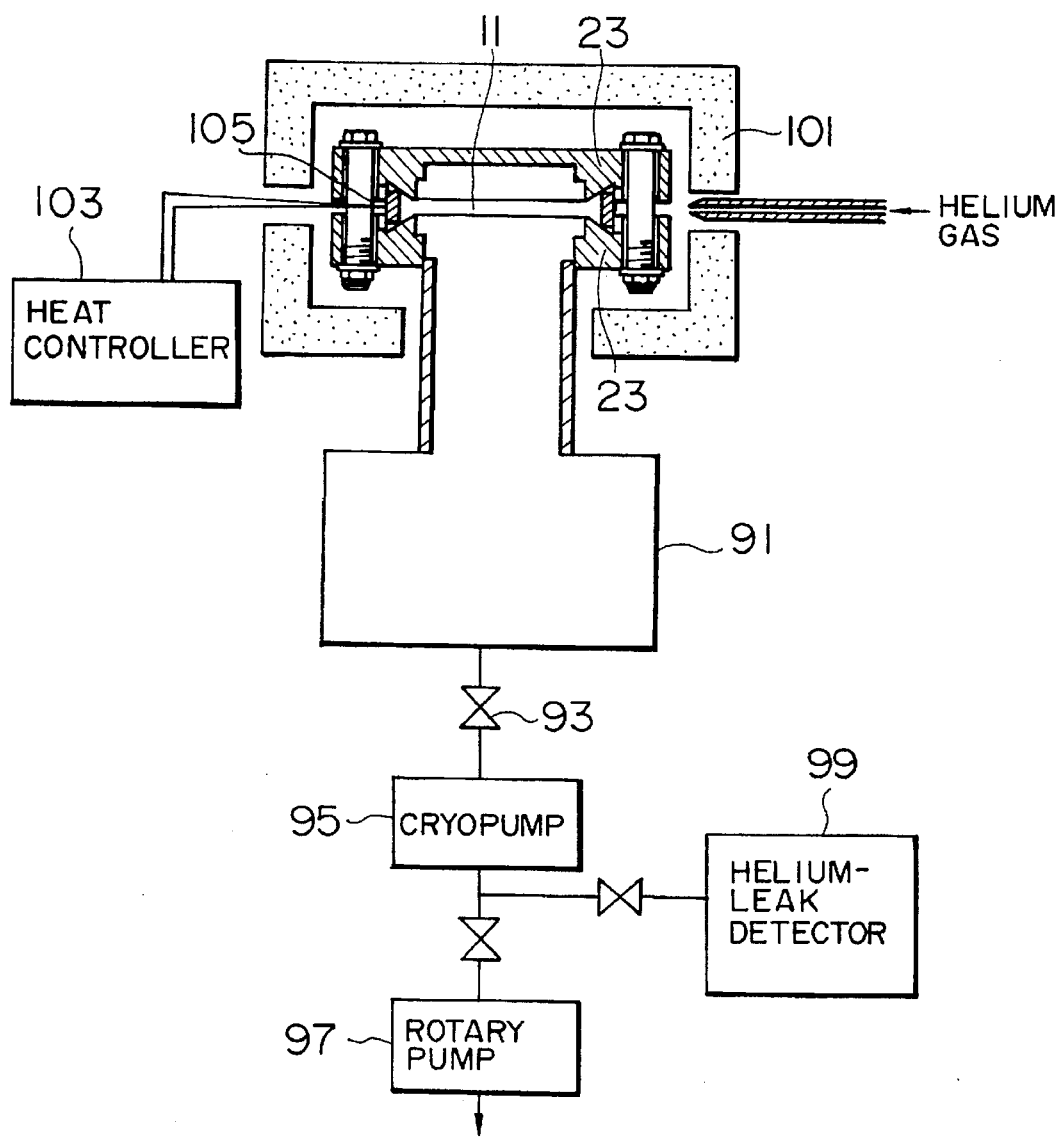
FIG. 6 is a diagram for explaining a leak testing device used in an experiment.
Figure 7:
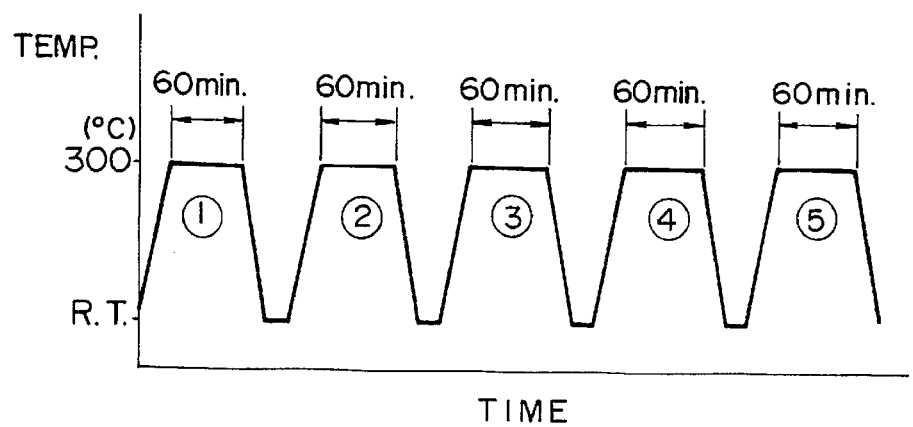
FIG. 7 is a graph of a heating pattern for a heating cycle test.
Figure 8A:
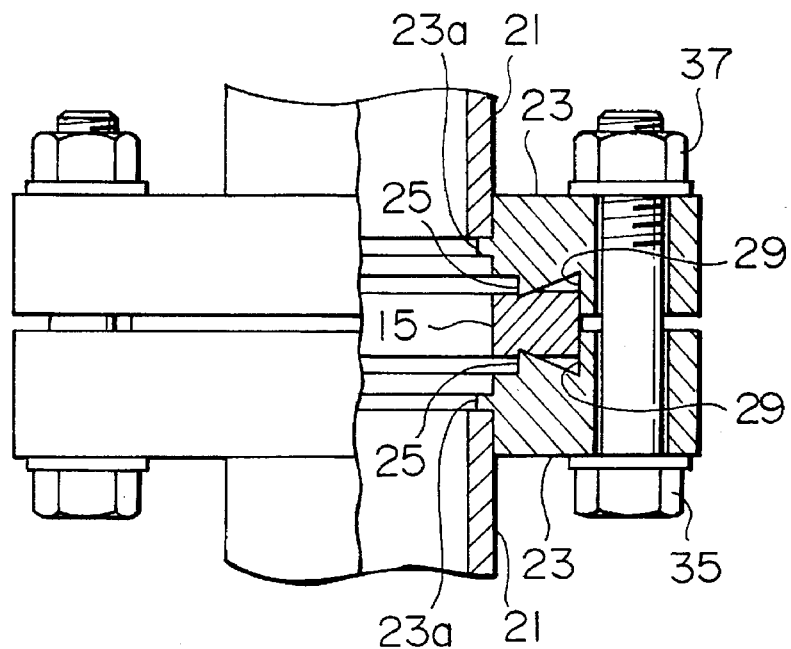
FIG. 8A is a half cross-sectional view of a conventional seal structure using a knife-edge-type metal-seal flange.
Figure 8B:
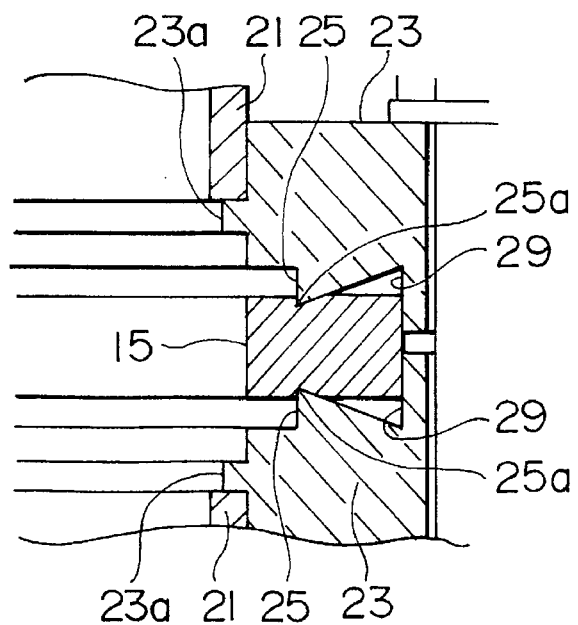
FIG. 8B is a partially enlarged view of the conventional seal structure shown in FIG. 8A.
Figure 9:
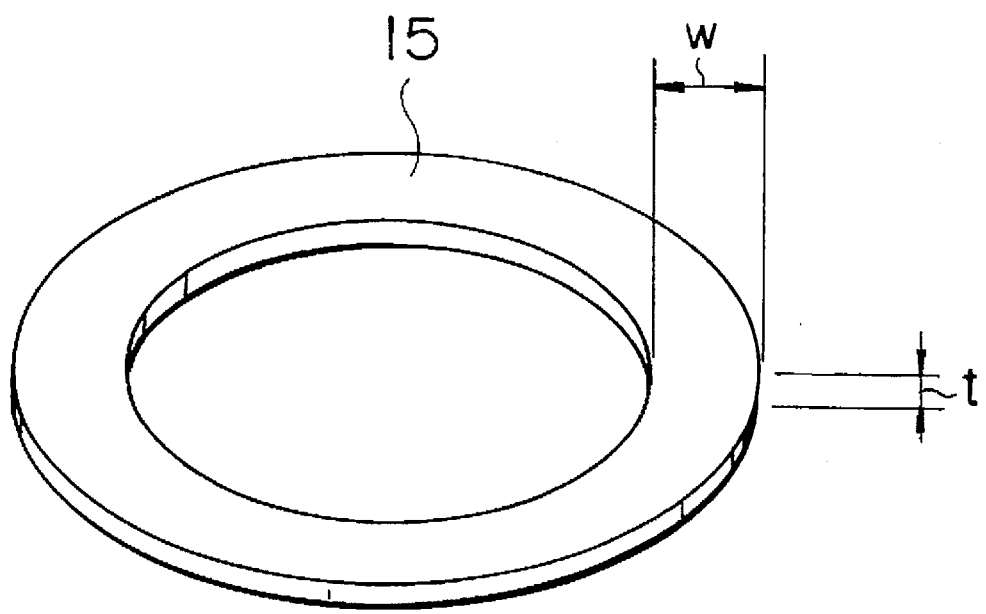
FIG. 9 is a perspective view of a conventional metal gasket.

An experimental example is shown using a metal gasket of the present invention in a conventional knife-edge-type metal-seal flange. As shown in Table 2, gaskets with diameters of 70 mm, 152 mm, and 253 mm were used with the knife-edge-type metal-seal flange. Twenty samples of gaskets with 70 mm diameter flanges were fabricated with the ratio of the thickness (t) to the width (w) t/w of approximately 1.93, as well as twenty samples each of gaskets with 152 mm diameter flanges and 253 mm flanges with the ratio t/w of approximately 2.11. Heating cycle tests with the heating pattern shown in FIG. 7 were implemented on these samples using the test device illustrated in FIG. 6.

TABLE 2

Table showing test gaskets used

| Test No. | Gasket dimensions (mm) | | | No. of Tests | Outer diameter of Knife-edge-type metal-seal flange (mm) |
|---|---|---|---|---|---|
| | Width (w) | Thickness (t) | t/w | | |
| (1) | 1.5 | 2.9 | 1.93 | 20 | 70 |
| (2) | 1.5 | 3.2 | 2.13 | 20 | 152 |
| (3) | 1.5 | 3.2 | 2.13 | 20 | 253 |

In the tests, first the test gaskets 11 were installed on the flange members 23, 23 at room temperature and a 100 kg-cm torque was applied to the bolt. Then, a leak test was carried out using a helium detection apparatus 99. After confirmation that no leaks were occurring, the test member was heated to 300° C. After standing for one hour at 300° C. controlled by a thermostat, a leak test was performed under high temperature conditions, after which the temperature was reduced to room temperature. This cycle was performed five times for each test gasket.

The results of the test are given in Table 3. During the twenty cycles for each of the three types of gaskets tested, in all cases, no leaks were found which were greater than the minimum detection value when tested with the helium leak detection apparatus.

TABLE 3

| | Gasket dimensions | | | No. of Tests | Test Results<br>Results of Helium Leak Test (x $10^{-10}$ Torr-1-s$^{-1}$) |
|---|---|---|---|---|---|
| No. | Width (w) | Thickness (t) | t/w | | |
| (1) | 1.5 | 2.9 | 1.93 | 20 | 1 to 4 (below detection sensitivity) |
| (2) | 1.5 | 3.2 | 2.13 | 20 | 1 to 4 (below detection sensitivity) |
| (3) | 1.5 | 3.2 | 2.13 | 20 | 1 to 4 (below detection sensitivity) |

What is claimed is:

1. A vacuum flange for a reusable metal gasket comprising a sealing groove for receiving the reusable metal gasket at the surface of said flange, the width of a cross section of said groove gradually decreasing in the direction of the depth thereof, an outer side wall section of said sealing groove being substantially perpendicular to the flange surface, and an inner side wall section of said sealing groove being inclined with respect to the flange surface, with a difference in level being provided so that the flange surface positioned to the inside of said sealing groove is lower than the flange surface positioned to the outside of said sealing groove; and there being no protruding section on said flange surface on the inside of said sealing groove wherein, no portion of the ring-shaped reusable gasket member extends out of the sealing groove and does not extend past the inner wall.

2. The vacuum flange for a reusable metal gasket as claimed in claim 1, wherein said difference in level is in the range of 0.3 to 1.0 mm.

3. The vacuum flange for a reusable metal gasket as claimed in claim 4, wherein said difference in level is in the range of 0.3 to 0.7 mm.

4. The vacuum flange for a reusable metal gasket as claimed in claim 2, wherein said inner sidewall section is inclined with a inclination angle in the range of 15 to 45 degrees.

5. The vacuum flange for a reusable metal gasket as claimed in claim 2, wherein said inner sidewall section is inclined with a inclination angle in the range of 15 to 30 degrees.

6. A vacuum seal structure using a reusable metal gasket, comprising:

a pair of flanges with a sealing groove in the surface of said flange, at least an inner side wall section of said sealing groove being inclined with respect to the flange surface in such a fashion that the width of a cross section of aid sealing groove decreases in the direction of the depth thereof, and an outer sidewall section of said sealing groove being substantially perpendicular to the flange surface, with a difference in level being provided so that said flange surface positioned to the inside of said sealing groove is lower than said flange surface positioned to the outside of said sealing groove, there being no protruding section on said flange surface on the inside of said sealing groove, wherein said difference in level is in the range of 0.3 mm to 1.0 mm; and a ring-shaped reusable gasket member with a substantially rectangular cross-section, which is accepted and pressed into said sealing groove opposing said flanges, with the ratio (t/w) of the thickness t of said ring-shaped gasket member to the width w thereof being in the range of 0.5 to 4, having a Vickers hardness in the range of 50 to 120, wherein no portion of the ring-shaped reusable gasket member extends out of the sealing groove, and wherein the ratio (t/w) and the Vickers hardness are chosen such that the reusable metal gasket is not deformed when pressed in the sealing groove and may be reused.

7. The vacuum flange for a reusable metal gasket as claimed in claim 6, wherein said difference in level is in the range of 0.3 to 0.7 mm.

8. The vacuum seal structure using a reusable metal gasket as claimed in claim 6, wherein said ratio (t/w) is in the range of 0.8 to 2.

9. The vacuum seal structure using a reusable metal gasket as claimed in claim 6, wherein said Vickers hardness' of the gasket is in the range of 80 to 110.

* * * * *

UNITED STATES PATENT AND TRADEMARK OFFICE
CERTIFICATE OF CORRECTION

PATENT NO. : 5,630,592
DATED : MAY 20, 1997
INVENTOR(S) : KENJIRO OBARA, ET AL

It is certified that error appears in the above-identified patent and that said Letters Patent is hereby corrected as shown below:

Column 3, line 47, delete "right" (second occurrence).

Column 7, line 41, change "4" to --1--.

Column 8, line 12, change "aid" to --said--.

Signed and Sealed this

Twenty-third Day of December, 1997

Attest:

BRUCE LEHMAN

Attesting Officer

Commissioner of Patents and Trademarks